United States Patent
Lan

(10) Patent No.: US 6,717,622 B2
(45) Date of Patent: Apr. 6, 2004

(54) SYSTEM AND METHOD FOR SCALABLE RESOLUTION ENHANCEMENT OF A VIDEO IMAGE

(75) Inventor: Tse-Hua Lan, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 352 days.

(21) Appl. No.: 09/822,437

(22) Filed: Mar. 30, 2001

(65) Prior Publication Data

US 2002/0140854 A1 Oct. 3, 2002

(51) Int. Cl.⁷ .................................................. H04N 5/21
(52) U.S. Cl. ...................... 348/625; 348/631; 348/458; 382/273; 382/299
(58) Field of Search ............................... 348/625, 631, 348/441, 581; 382/199, 266, 273, 298–300, 301

(56) References Cited

U.S. PATENT DOCUMENTS

| | | | |
|---|---|---|---|
| 5,661,824 A | | 8/1997 | Allebach et al. ............ 382/298 |
| 5,875,268 A | * | 2/1999 | Miyake ....................... 382/276 |
| 6,008,862 A | * | 12/1999 | Bellers ........................ 348/631 |
| 6,084,989 A | * | 7/2000 | Eppler ......................... 382/293 |
| 6,347,153 B1 | * | 2/2002 | Triplett et al. ............... 382/224 |
| 6,408,109 B1 | * | 6/2002 | Silver et al. ................. 382/300 |
| 6,573,940 B1 | * | 6/2003 | Yang .......................... 348/441 |

FOREIGN PATENT DOCUMENTS

EP 1018705 A2 7/2000

OTHER PUBLICATIONS

US 000058, U.S. Ser. No. 09/639,147 Aug. 16, 2000, He et al..

* cited by examiner

Primary Examiner—Victor R. Kostak
(74) Attorney, Agent, or Firm—Dicran Halajian

(57) ABSTRACT

A system and method for enhancing resolution in a video image includes acquiring a relatively low resolution video signal and applying a peaking function and analyzing the peaked signal to identify potential edges. The low resolution signal is then upconverted to a higher resolution format. Actual edges in the image are detected and linked in the higher resolution format, and a luminance transition improvement function is applied to the edges to sharpen the image. Analysis of the image while at low resolution reduces computation time, yet still produces a high quality output image.

26 Claims, 4 Drawing Sheets

SYSTEM AND METHOD FOR SCALABLE RESOLUTION ENHANCEMENT OF A VIDEO IMAGE

Cross reference is made to U.S. Ser. No. 09/639,147, to He, et al. entitled System and Method for Improving the Sharpness of a Video Image, filed Aug. 16, 2000 and assigned to the assignee of the present invention, which matured into U.S. Pat. No. 6,600,517, the contents of which are hereby incorporated by reference in its entirety.

FIELD OF THE INVENTION

This invention relates to the display of video signals on an output device. More specifically, the invention relates to a system and apparatus for enhancing the quality of output signals that have been converted from a lower resolution format.

BACKGROUND OF THE INVENTION

Television images are created when an electron gun inside a cathode ray tube delivers a series of horizontal lines to a phosphor. The glow from the phosphor is reflected on to the monitor to create the image. In the United States, television broadcast standards are currently set by the National Television Standards Committee (NTSC). In accordance with these standards, 480 lines are displayed on the screen at a time, and the image on the screen is displayed 60 times per second. While these lines are displayed together, it is important to note that all lines are not always re-drawn by the electron gun at the same time. In addition to setting the number of lines that are displayed on the screen, the NTSC standard provides for an "interlaced" display system. This means that the 480 lines are drawn in two groups of 240 lines each, with the odd numbered lines being drawn during one pass, and the even numbered lines being drawn during another. In other words, each group of lines is displayed 30 times per second. The system described above is typically referred to as a "480i" system.

The NTSC standard provides for an analog signal. However, there is a significant effort underway to deliver digital television (DTV) signals to households, and it is almost a certainty that DTV broadcasts will replace analog television broadcasts in the near future. There are numerous DTV formats. Some of these use an interlaced system such as that described above, while other use a "progressive" format. In a progressive system, all lines of resolution are re-drawn during each pass. Thus, while a 480p system will have the same number of horizontal lines as a 480i system, the 480p image will appear to be much more smooth because the lines in the image will be re-drawn twice as fast. DTV standards are being set by the Advanced Television Systems Committee (ATSC), an international organization. The ATSC has assigned 18 different DTV formats, which provide for different numbers of lines, as well as use of both the progressive and interlaced formats. Currently, the most common formats are 480p, 720p and 1080i.

These developments have created a need for television systems that can receive and display television broadcast signals that are presented in different formats. One way to accomplish such a task is to include a device in the television set that can receive signals in an incompatible format, and convert it to the format that the television set can use. Conversions between formats often result in the loss of data, which deteriorates the quality of the image that is displayed. For example, upconversion—conversion from a low resolution format to a higher resolution format—typically requires interpolating the originally provided broadcast signal. For example, in the near future, many consumers will have televisions that are capable of displaying High Definition (HD) broadcast signals. However, televisions signals are currently broadcast in the lower resolution Standard Definition (SD) format. It will be some time before television stations convert their broadcasts to the HD format. Thus, it is necessary to include a device in a HD television set that can receive SD signals and convert them to the HD format.

The upconversion process typically requires the use of an interpolation filter, to remove the high frequency images that are contained in upsampled pictures. More specifically, during the upconversion process some pixel values will be set equal to zero. If these zero value pixels are displayed as is, they will appear as black spots on the television screen. Instead, an interpolation filter is applied to the upsampled image to reset them to non-zero values, and thereby generate a more visually appealing reproduction of the picture that has been converted. As a practical matter, the filter that is applied to the upconverted image will not be ideal—not all of the high frequency images will be removed, and thus, some very weak high frequency energy will remain in the upconverted picture. To human vision, the high frequency data in an upconverted image is usually perceived as blurring. One way to eliminate this blurring is to sharpen the edges of the picture and to enhance the contrast of its texture areas. This edge sharpening and contrast enhancement creates new high frequency components in the picture, and bursts the existing mid level frequencies. While it is typically not possible to recreate all of the details that are lost during low resolution video production (e.g. SD video recording), these processes help to restore at least some of the quality of the original picture. However, a need remains for improved methods and systems for processing images that have been converted from another format, particularly those that minimize processing and computation time, in order to enhance their quality.

SUMMARY OF THE INVENTION

In accordance with an embodiment of the invention, a method of enhancing the resolution of a video signal includes acquiring a relatively low resolution video signal, such as a Standard Definition Television signal. A peaking function is applied to the low resolution signal and the peaked signal is analyzed to identify pixels that may be edges. The peaked signal is then "upconverted"—its resolution is increased to that of the desired output, such as a High Definition Television signal. An edge detection function is then applied to the higher resolution video signal, specifically at the pixels that correspond to those that were previously identified as possibly being edges. Edge linking is applied to the detected edges, a luminance transition improvement function is applied to the detected edges and the processed high resolution signal is output to a high resolution display.

In accordance with the invention, application of the peaking function increases image quality by increasing the perceived contrast of the original image. That is, it will appear to the human eye that the contrast of the image has been increased, particularly in its textured regions. The peaking function is typically applied prior to upconversion. The edge detection function is then applied after upconversion to accurately determine which of the upconverted pixels are edges. Functions that are provided in accordance with the invention produce estimated values for characteristics of the image, which reduces computation time while maintaining image quality. Detected edges in the image are linked and the image is sharpened in the horizontal and vertical directions. According to the invention, various parameters can be altered to scale the complexity of the processing operations, and control the level of resolution enhancement that takes place.

Other embodiments of the present invention and features thereof will become apparent from the following detailed description, considered in conjunction with the accompanying drawing figures.

While the present invention will be described in connection with certain embodiments thereof, it is to be understood that the invention is not limited to those embodiments. On the contrary, it is intended to cover all alternatives, modifications, and equivalents as may be included within the spirit and scope of the invention as defined by the appended claims.

DETAILED DESCRIPTION OF EMBODIMENTS OF THE INVENTION

Figure 1:
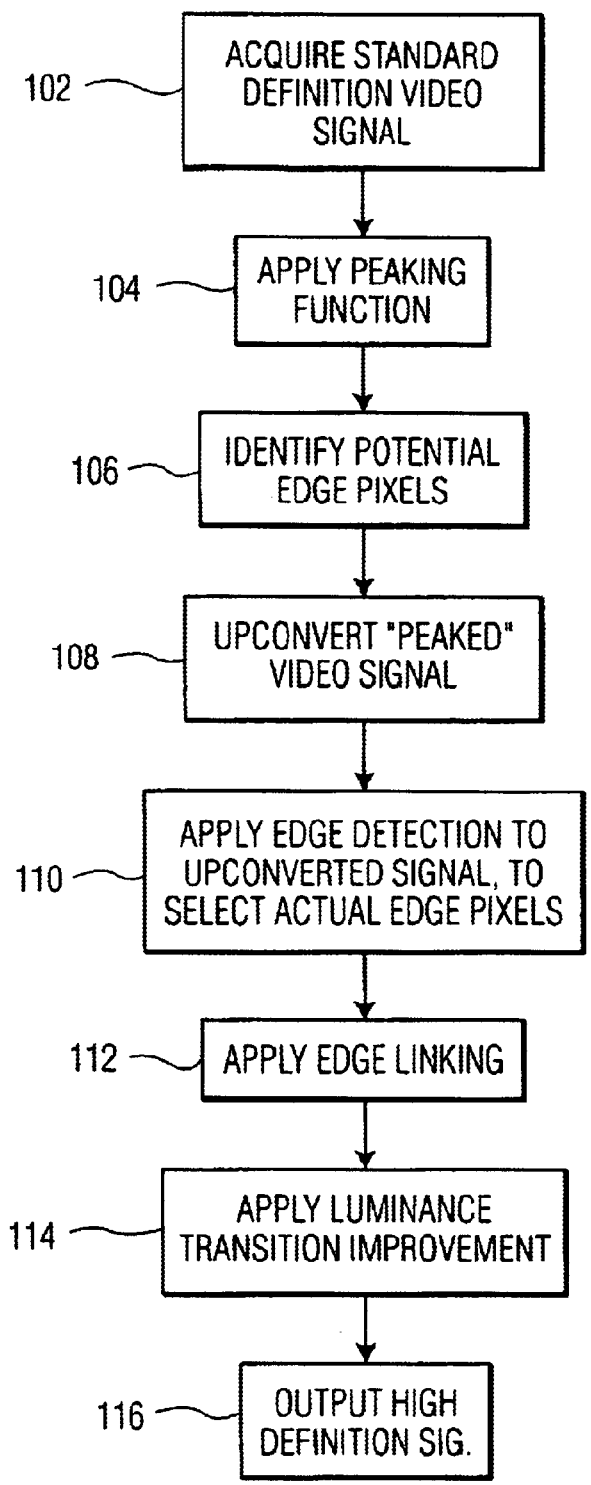
FIG. 1 contains a block diagram that provides one example of video image resolution enhancement according to the invention.

Referring now to the drawings which are provided to describe embodiments of the invention and not for limitation, FIG. 1 contains a flow chart depicting one method of enhancing the resolution of a video signal in accordance with the invention. In this embodiment, a video signal is acquired at a first resolution as shown in block 102. Television and video signals are typically formed in an array of pixels arranged in rows and columns. The array is not usually square—i.e. the number of rows is typically not equal to the number of columns. In one embodiment, the acquired signal is a Standard Definition Television (SDTV) signal which, according to the standard, is formatted at 480i. While the invention is described with reference to SDTV signals and to High Definition Television (HDTV) signals, it is to be understood that other formats are available, and that the invention could applied to those as well.

Figure 2:
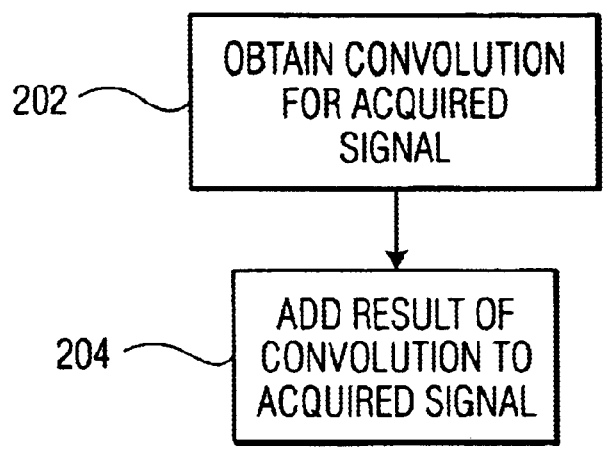
FIG. 2 is a block diagram that depicts exemplary steps that may be followed in applying a peaking function to the acquired signal in accordance with the invention.

A peaking function is applied to the acquired image, as shown in block 104. Generally speaking, application of the peaking function will increase image quality by increasing the perceived contrast in textured regions of the image. Turning now to FIG. 2, in one embodiment, the peaking function is provided by obtaining the convolution of the image with a non-separable two dimensional Finite Impulse Response (FIR) filter as indicated in block 202, and adding the values resulting from the convolution to the original pixel values at block 204. In one embodiment a FIR filter with 9 coefficients is applied. In one embodiment, a FIR filter with coefficients equal to 0 −1 0; −1 4 −1; 0 −1 0 was successfully used.

Figure 3:
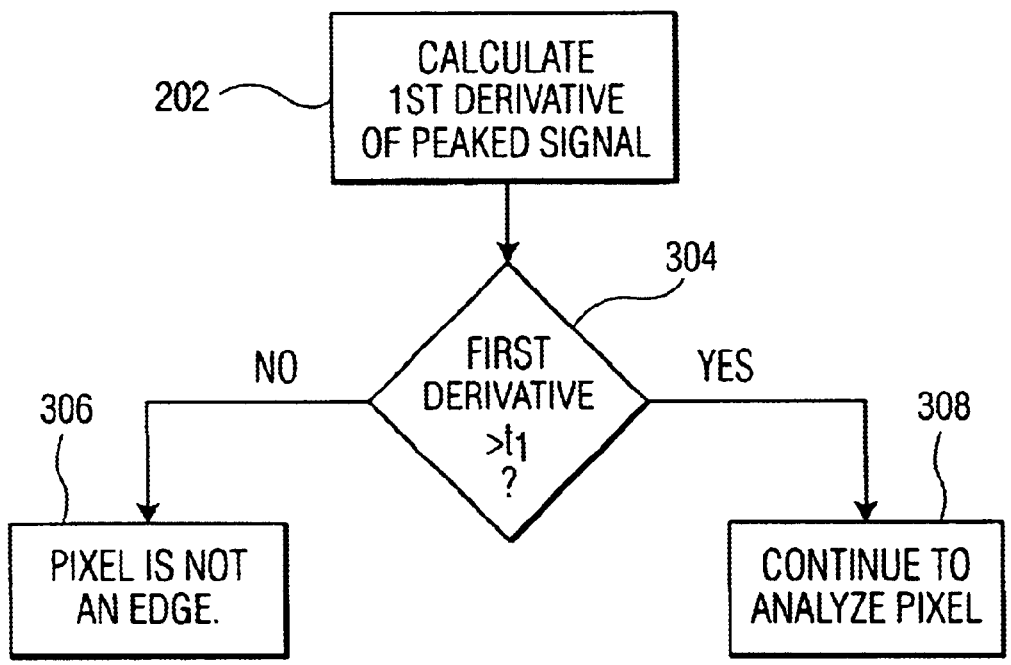
FIG. 3 is a flow chart that shows how potential edges may be identified in accordance with the invention.

Referring again to FIG. 1, after the peaking function is applied to the acquired signal, the peaked signal (the signal that results from applying the peaking function to the acquired signal is hereinafter referred to as the "peaked" signal) is analyzed to determine which pixels might be edges, as shown in block 106. Turning to FIG. 3, in one embodiment, this analysis includes taking the first derivative of the peaked signal as indicated at block 302 and comparing it to a threshold at block 304. This threshold is typically set based upon the desired complexity of the subsequent computations. For example, a low threshold will increase the number of potential edges, while a high threshold will simplify the computation and reduce the number of potential edges. Thus, in accordance with the invention, the complexity of the processing operations can be scaled as desired in order to balance the savings in computation time and the level of image enhancement. If the first derivative exceeds the threshold at a given pixel, the pixel could be an edge, and will be subjected to further processing as indicated in block 308.

As indicated earlier, video signals are typically arranged in rows and columns. The peaking function (and the other functions that will be applied to signals in accordance with the invention) will, therefore, be applied in both the horizontal and vertical directions. The first derivative of the signal may be obtained by calculating the difference between pixel values. In one embodiment, the first derivative is obtained by calculating the difference between the values of two adjacent pixels.

With continued reference to FIG. 1, an upconversion operation is next applied to the peaked signal as shown in block 108, to increase its resolution. For example, upconversion can convert a SDTV signal formatted at 480i to be properly displayed in a HDTV at 1080i. In one embodiment, upconversion is performed by linear interpolation—i.e. by averaging two adjacent pixels. In another embodiment, upconversion is performed using a Gaussian interpolation—i.e. by performing a convolution on the originally provided signal and applying a Gaussian filter to the result. It should be noted that while the invention is described using linear and Gaussian interpolations, upconversion could take place in other ways.

Figure 4:
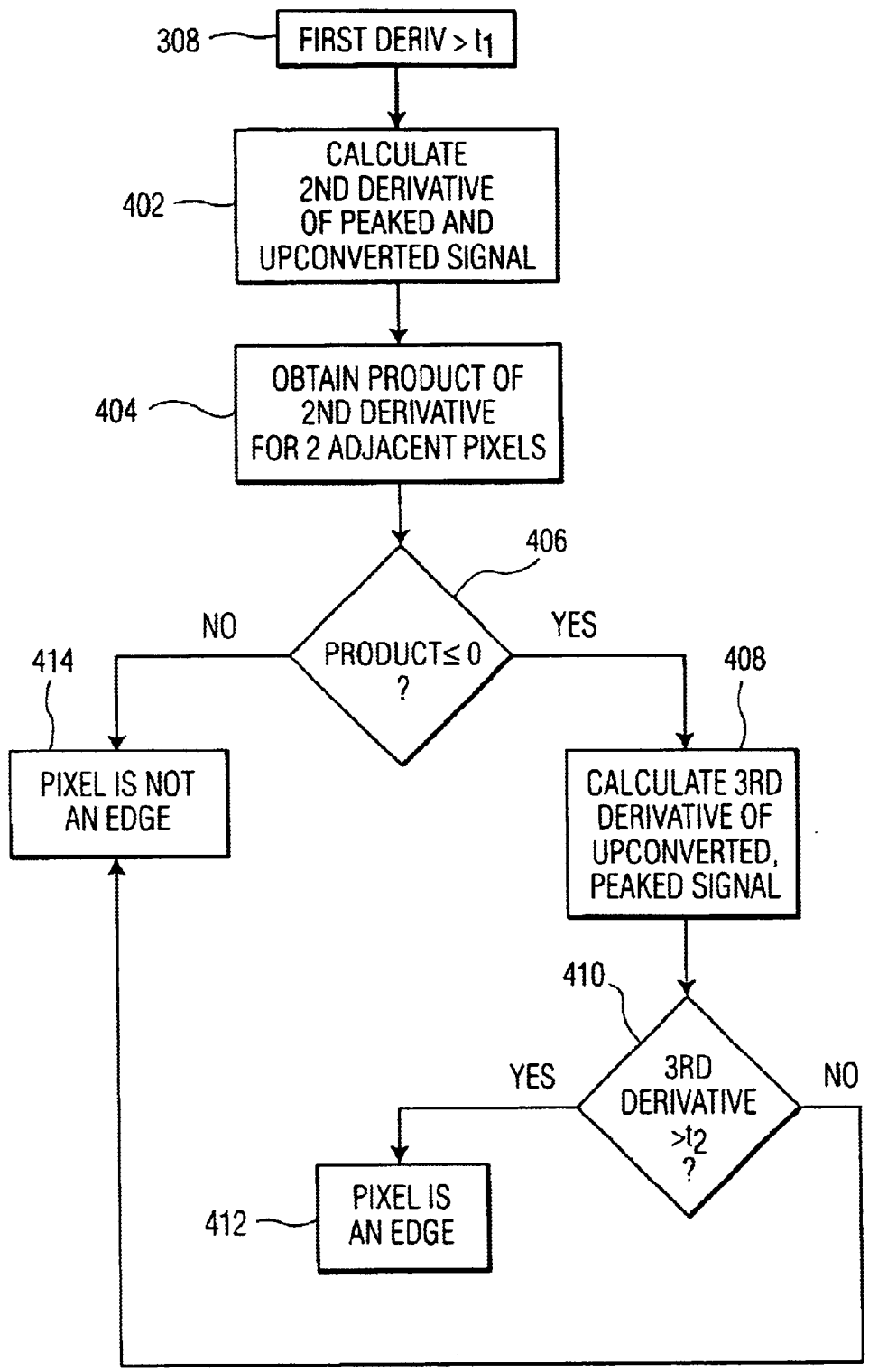
FIG. 4 is a flow chart that provides an example of how edge detection may be performed according to the invention.

Referring back to FIG. 1, an edge detection function is next applied to the upconverted signal as indicated in block 110. Application of such a function determines which of those pixels that were previously identified as potential edges really are edges in the originally acquired image. Referring now to FIG. 4, in one embodiment of the invention, edge detection includes calculating the second derivative of the peaked signal as indicated in block 402. The second derivative may be obtained by calculating the weighted difference of three adjacent pixels. If the product of the second derivative for two adjacent pixels is less than or equal to zero at block 406, at least one of those pixels might be an edge, since that would mean that adjacent pixels either have values with opposite signs or that at least one of them has a value equal to zero (i.e. there has been a zero crossing). When this is the case, the third derivative of the peaked and upconverted signal is calculated at block 408 and compared to a second threshold value at block 410. Again, the magnitude of this threshold can be selected as desired to scale the complexity of the processing operations.

The third derivative of the signal represents its zero crossing rates. It illustrates the rate at which the slope of the edge changes, and thus, how steep the edge is. If the value of the third derivative of a pixel is too small, the pixel is most likely only a soft edge or a semi-soft edge, and further processing is not necessary in order to complete resolution enhancement. Thus, the pixel will only be classified as an edge if the third derivative exceeds the second threshold at block 412. In one embodiment, the second threshold value is equal to the product of the previously determined first derivative of the peaked signal and a constant. In one embodiment, a constant with a magnitude equal to 0.45 was used successfully. In this embodiment, the magnitude of this constant was selected by observation, and showed to eliminate a sufficient amount of soft edges from further resolution enhancement, while maintaining the quality of the output image.

Referring again to FIG. 1, an edge linking function will next be applied as indicated in block 112. Generally speaking, edge linking is performed to connect discontinuous edge points and to eliminate isolated edge points. In one embodiment, the edge linking function will be applied to all of those pixels that have been designated as edges after edge detection has been completed.

Turning back to FIG. 1, a luminance transition improvement ("LTI") function is next applied to the edges of the upconverted signal at block 114. A LTI function generally replaces slow luminance transitions with steep transitions, thereby sharpening the edges. LTI is performed at the "subpixel" level. That is, each pixel is divided into multiple sections (i.e. subpixels) and the characteristics of each subpixel are analyzed to determine the exact point, inside the pixel, where the edge is located.

In one embodiment the function that is applied to the higher resolution video signal in order to find the location of the edge inside the pixel is defined as:

$$c = \text{round}[N*L''(x-1)/(abs(L''(x-1))+abs(L''(x)))]$$

where c is the mathematical rounding function (rounds the argument to the nearest integer), N represents the number of subpixels into which each pixel is divided, x represents the pixel that is being evaluated and L" represents the second derivative of the higher resolution video signal (L represents the derivative). This location (also referred to as the center of the edge) is used to select filters in a predetermined LTI polyphase look up table ("LUT") that will be applied to the upconverted image to complete the sharpening process. More specifically, the location of the edge is used as a coefficient that is mapped to the LUT, and the corresponding filter is selected and retrieved from the LUT. The filter performs a convolution on the edge pixel and the result is added to the edge to accomplish the sharpening.

Pixels that lie adjacent to the identified edge point must also be enhanced in order to produce a visible improvement in the quality of the image. Therefore, additional pixels are preferably included before the filter is applied. In one embodiment, four pixels, including the edge pixel, are included. In this embodiment, four filters are associated with the mapping coefficient. All four filters are retrieved from the LUT and four convolution results are produced. In another embodiment, six pixels are analyzed, which causes six filters to be associated with the mapping coefficient. Six filters are therefore, retrieved from the LUT to produce six convolution results.

As was the case for edge linking, in one embodiment of the invention, this LTI function is applied to all of the pixels that have been designated as edges during the edge detection and linking processes. In one embodiment, all pixels in the upconverted image that undergo edge detection are processed in succession. In such an embodiment, horizontal and vertical counters could be used to identify pixel locations. The counters can be incremented to process each pixel in succession until the pixel that is located in the last row of the last column has been processed. The entire image can then be displayed on a high definition output as indicated in block 116.

In one embodiment, the video signal that is originally delivered may be in the progressive format, while in another embodiment, it may be in the interlaced format. Under some circumstances, it may be desired to convert the video signal from one format to another before subjecting it to further processing. For example, in one embodiment, the invention may be set up to process only signals that are in the progressive format. In such a case, a video signal that is delivered in the interlaced format would typically be converted to the progressive format before it is acquired at step 102. Similarly, it may be desired to convert the video signal to another format after it has been processed. Thus, a signal that has been processed in the progressive format according to the following steps may be displayed at block 116 on a device that can only display interlaced formatted signals. Under these circumstances, the processed signals could be converted from the progressive format to the interlaced format before they are transmitted to the display. While the invention is described here using signals that are processed in the progressive format, it is to be understood that it could be adapted to process signals in the interlaced format. It should also be understood that in such a case, an input video signal could be converted from the progressive format to the interlaced format prior to acquisition at block 102, and it could be converted from the interlaced format back to the progressive format before being output at block 116. Further, it is to be understood that the invention could be adapted to acquire signals in the progressive format and display them in the interlaced format, and vice versa. It is intended to embrace all such alternatives within the scope of the invention.

In an embodiment of the invention that outputs the signals in the interlaced format, processing of every other pixel in a row can be skipped during the horizontal pass in order to save computation time, since by definition, there are no pixels in every other line (i.e. every other location in a column) in the interlaced format. It should be noted that during LTI, the four or six pixels (processing four pixels rather than six will save computation time) in one direction nearest the edge point are modified in order to create a natural, sharpened edge. Modifying only the edge point without the surrounding pixels or skipping the application of LTI at every other pixel would instead create artifacts. Thus, unlike the horizontal pass, processing during the vertical pass requires processing every pixel in the column because the pixels that surround the edge point would not otherwise be modified as required.

Once application of the LTI function is complete, the video signal can be displayed at the resolution that was applied during upconversion. Video signals that are enhanced according to the invention are at a relatively high resolution signal compared to the acquired image, yet they can be displayed with high image quality.

Figure 5:
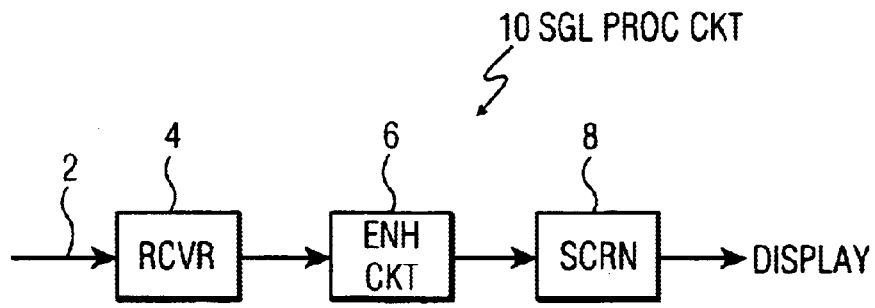
FIG. 5 shows an example of circuitry that may be used to segment pixels in an image, in accordance with an aspect of the invention.
Figure 6A:
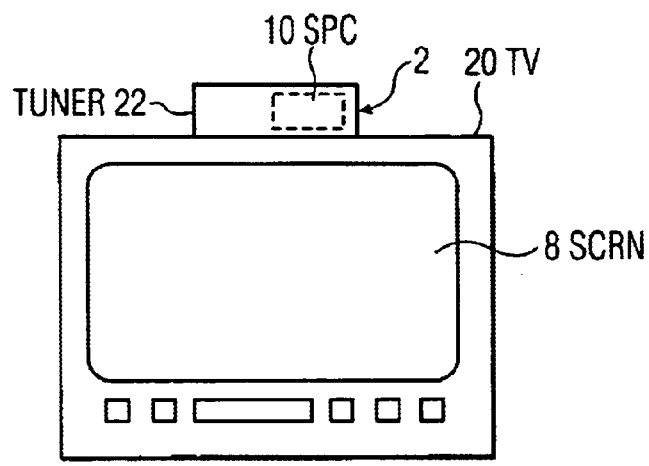
FIGS. 6A and 6B illustrates how the circuitry of FIG. 5 may be incorporated into a television system to display images in accordance with the invention.
Figure 6B:
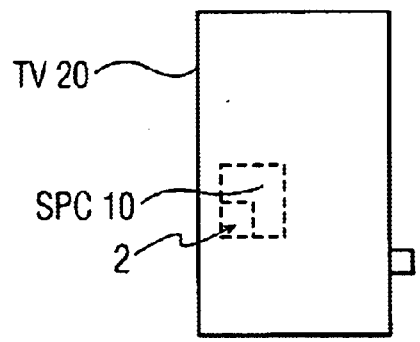

As illustrated in FIG. 5, circuitry 10 for enhancing resolution of video signals according to the invention may include a receiver 4, which accepts a signal 2 from a television broadcast studio or other video generating location. Signal 2 is transmitted to circuit 6, where it is upconverted and its resolution is enhanced in accordance with the invention. Output signals generated by enhancement circuit 6 are delivered to the screen 8 of a television 20. Referring to FIGS. 6A and 6B, a signal 2 will typically be received at an input and transmitted to a tuner 22. Circuitry 10 will typically be placed somewhere between the output of a television tuner 22 and television screen 8.

It is, therefore, apparent that there has been provided, in accordance with the present invention, method and system for enhancing resolution in an image while minimizing processing resources. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of scaling resolution enhancement in a video signal, comprising:
    acquiring a first resolution video signal;
    applying a peaking function to said first resolution video signal to create a peaked signal;
    analyzing said peaked signal to identify possible edge pixels in said first resolution video signal;
    upconverting said peaked signal to a higher resolution video signal;
    applying an edge detection function to said higher resolution video signal at pixels that correspond to said first resolution video signal possible edge pixels, thereby identifying higher resolution video signal edge pixels;
    applying an edge linking function to said higher resolution video signal edge pixels;
    applying a luminance transition improvement function to said higher resolution video signal edge pixels; and
    outputting said higher resolution video signal.

2. A method as claimed in claim 1 wherein said peaking function further comprises:
    obtaining the convolution of said first resolution video signal; and
    adding a result of said convolution to said acquired first resolution video signal.

3. A method as claimed in claim 1 wherein analyzing said peaking function further comprises:
    calculating a first derivative of said peaked signal; and
    designating a peaked signal pixel as a potential edge if said first derivative at said first resolution video signal pixel is greater than a first threshold value.

4. A method as claimed in claim 1 wherein said acquired first resolution video signal is in an interlaced format.

5. A method as claimed in claim 4 wherein said first resolution video signal is delivered in an interlaced format and converted to a progressive format prior to application of said peaking function.

6. A method as claimed in claim 1 wherein said edge detection function further comprises:
    calculating a second derivative of said upconverted signal;
    if said second derivative indicates that there has been a zero crossing, calculating a third derivative of said peaked signal;
    identifying said pixel as an edge if said third derivative is greater than a second threshold value.

7. A method as claimed in claim 6 wherein said second threshold value is equal to a multiple of said first derivative and a constant.

8. A method as claimed in claim 1 wherein said edge linking function further comprises:
    identifying isolated edge pixels; and
    removing said identified isolated edge pixels.

9. A method as claimed in claim 1 wherein said luminance transition improvement function comprises:
    dividing a higher resolution video signal edge pixel into multiple sub-regions;
    analyzing each subregion to determine a location, inside said pixel, where an edge is located;
    using said edge location to select a filter; and
    applying said selected filter to said higher resolution edge pixel.

10. A method as claimed in claim 9 wherein said edge location is defined as:

$$c=\text{round}[N*L"(x-1)/(abs(L"(x-1))+abs(L"(x)))]$$

where c is the mathematical rounding function, N represents a number of subpixels into which each pixel is divided, x represents the pixel that is being evaluated and L" represents the second derivative of the higher resolution video signal.

11. A method as claimed in claim 9 wherein said edge location is used as a coefficient that is mapped to filters that are stored in a look up table.

12. A method as claimed in claim 11 further comprising
    selecting additional pixels that neighbor said higher resolution video signal edge pixel;
    selecting a filter from said look up table for each additional selected pixel; and
    applying said selected filters to said higher resolution video signal edge pixel and to said additional selected pixels.

13. A method of scaling resolution enhancement in a video signal, comprising:
    acquiring a first resolution video signal matrix;
    applying a peaking function to said first resolution video signal matrix, to create a peaked signal matrix;
    analyzing said peaked signal matrix to identify potential edge pixels in said first resolution video signal matrix;
    upconverting said peaked first resolution video signal matrix to a higher resolution video signal matrix;
    applying an edge detection function to said higher resolution video signal matrix at pixels that correspond to said potential edge pixels identified in said first resolution video signal matrix, thereby identifying higher resolution video signal matrix edge pixels;
    applying an edge linking function to said higher resolution video signal matrix at pixels that are identified as higher resolution video signal matrix edge pixels;
    applying a luminance transition improvement function to said higher resolution video signal matrix at pixels that are identified as higher resolution video signal matrix edge pixels; and
    outputting said higher resolution video signal matrix.

14. A method as claimed in claim 13 wherein said edge detection function further comprises:
    calculating a second derivative of said higher resolution video signal matrix;
    calculating a third derivative of said higher resolution video signal matrix;
    if a product of a second derivative of two adjacent pixels in said higher resolution video signal matrix is less than or equal to zero and said third derivative of one or more of said two adjacent pixels is greater than a second threshold value, identifying said one or more of said two adjacent pixels as an edge; and processing at least a third pixel in said matrix and identifying said at least third pixel as an edge if a product of a second derivative of said at least third pixel and a second derivative of a pixel adjacent to said at least third pixel in said matrix is equal to zero and said third derivative of said at least third pixel is greater than a second threshold value.

15. A method as claimed in claim 13 wherein said luminance transition improvement function comprises:

dividing a higher resolution video signal edge pixel into multiple sub-regions;

analyzing each subregion to determine a location, inside said pixel, where an edge is located;

using said edge location to select a filter; and applying said selected filter to said higher resolution edge pixel.

16. A method as claimed in claim 15 wherein said edge location is defined as:

$$c = \text{round}[N*L''(x-1)/(abs(L''(x-1))+abs(L''(x)))]$$

where c is the mathematical rounding function, N represents a number of subpixels into which each pixel is divided, x represents the pixel that is being evaluated and L'' represents the second derivative of the higher resolution video signal.

17. A method as claimed in claim 15 wherein said edge location is used as a coefficient that is mapped to filters that are stored in a look up table.

18. A method as claimed in claim 17 further comprising selecting additional pixels that neighbor said higher resolution video signal edge pixel;

selecting a filter from said look up table for each additional selected pixel; and applying said selected filters to said higher resolution video signal edge pixel and to said additional selected pixels.

19. A method as claimed in claim 14 wherein said higher resolution video signal is generated in a progressive format and converted to an interlaced format prior to being displayed.

20. A method as claimed in claim 19 wherein said at least second pixel lies two columns from said immediately previously processed pixel.

21. A method of enhancing the resolution of a video signal, comprising:

acquiring a first resolution video signal;

increasing a perceived contrast of said first resolution video signal, to generate a peaked video signal;

analyzing said peaked video signal to identify potential edge pixels in said first resolution video signal;

upconverting said peaked video signal to a higher resolution video signal;

applying an edge detection function to said higher resolution video signal to identify actual edge pixels in said higher resolution video signal;

applying an edge linking function to said higher resolution video signal at pixels that are identified as said actual higher resolution video signal edge pixels;

applying a luminance transition improvement function to said higher resolution video signal; and outputting said higher resolution video signal.

22. A method of enhancing the resolution of a video signal, comprising:

acquiring a first resolution video signal;

applying a peaking function to said first resolution video signal to create a peaked signal, wherein said peaking function is calculated by obtaining the convolution of said first resolution video signal and adding a result of said convolution to said acquired first resolution video signal;

analyzing said peaked signal to identify potential edge pixels in said first resolution video signal;

upconverting said peaked signal to a higher resolution video signal;

applying an edge detection function to said higher resolution video signal at pixels that correspond to said first resolution video signal potential edge pixels, thereby identifying higher resolution video signal edge pixels, wherein said edge detection function is obtained by calculating a second derivative of said peaked signal, and if a product of a second derivative of two adjacent pixels in said higher resolution video signal is less than or equal to zero, calculating a third derivative of said peaked signal, and identifying said pixel as an edge if said third derivative is greater than a second threshold value;

applying an edge linking function to said higher resolution video signal at pixels that are identified as higher resolution video signal edge pixels;

applying a luminance transition improvement function to said higher resolution video signal at pixels that are identified as higher resolution video signal edge pixels; and outputting said higher resolution video signal.

23. A device for scaling resolution enhancement in a video signal, comprising:

a receiver that accepts the video signal at a first resolution;

a peaking system which increases a perceived contrast of the accepted video signal to create a peaked signal;

textured signal edge detector which identifies possible edge pixels in said peaked signal;

an upconverter which transforms said peaked video signal to a higher resolution video signal;

an upconverted edge detector which analyzes pixels in said higher resolution video signal that correspond to said peaked signal possible edge pixels to identify higher resolution video signal edge pixels;

an edge linker which connects said identified higher resolution video signal edge pixels;

a luminance transition improvement device which sharpens said connected higher resolution video signal edge pixels by replacing slow luminance transitions with steep luminance transitions; and a display coupled to said receiver to output said higher resolution video signal.

24. A device for scaling resolution enhancement in a video signal, comprising:

a receiver that accepts the video signal at a first resolution;

a peaking system which increases a perceived contrast of said accepted video signal to create a peaked signal;

a textured signal edge detector which analyzes a first derivative of said peaked signal to identify peaked signal possible edge pixels;

an upconverter which transforms said peaked signal to a higher resolution video signal;

an upconverted edge detector which calculates a second derivative of said peaked signal to identify zero crossings and calculates a third derivative at said peaked signal zero crossing pixels to identify higher resolution video signal edge pixels;

an edge linker which connects said identified higher resolution video signal edge pixels;

a luminance transition improvement device which sharpens said connected higher resolution video signal edge pixels by dividing a higher resolution video signal edge pixel into multiple sub-regions, analyzing each subregion to determine a location, inside said pixel, where an edge is located, using said edge location to select a filter; and applying said selected filter to said higher resolution edge pixel; and a display coupled to said receiver to output said higher resolution video signal.

25. A television receiver, comprising:

a tuner for receiving and tuning to a television signal at a first resolution;

a television signal processing circuit coupled to a display to deliver an enhanced resolution television signal, wherein generation of said enhanced resolution television signal further comprises:

applying a peaking function to said first resolution television signal to create a peaked signal;

analyzing said peaked signal to identify possible edge pixels in said first resolution television signal;

upconverting said peaked signal to a higher resolution television signal;

applying an edge detection function to said higher resolution television signal at pixels that correspond to said first resolution television signal possible edge pixels, thereby identifying higher resolution television signal edge pixels;

applying an edge linking function to said higher resolution television signal edge pixels;

applying a luminance transition improvement function to said higher resolution television signal edge pixels; and outputting said higher resolution television signal.

26. A television receiver, comprising:

a tuner for receiving and tuning to a television signal at a first resolution;

a television signal processing circuit coupled to a display to deliver an enhanced resolution television signal, wherein generation of said enhanced resolution television signal further comprises:

applying a peaking function to said first resolution television signal to increase a perceived contrast of said television signal;

analyzing said television signal peaked signal to identify possible edge pixels;

upconverting said first resolution television signal to a higher resolution television signal;

applying an edge detection function to said higher resolution television signal to identify zero crossings and analyzing said zero crossing pixels to identify higher resolution television signal edge pixels;

applying an edge linking function to said identified higher resolution television signal edge pixels;

applying a luminance transition improvement function to said identified higher resolution television signal edge pixels by dividing a higher resolution video signal edge pixel into multiple sub-regions, analyzing each subregion to determine a location, inside said pixel, where an edge is located, using said edge location to select a filter; and applying said selected filter to said higher resolution edge pixel; and outputting said higher resolution television signal.

* * * * *